(12) United States Patent
Li

(10) Patent No.: US 12,538,303 B2
(45) Date of Patent: Jan. 27, 2026

(54) INFORMATION MULTIPLEXING METHOD AND APPARATUS, AND USER EQUIPMENT

(71) Applicant: VIVO MOBILE COMMUNICATION CO., LTD., Guangdong (CN)

(72) Inventor: Na Li, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 435 days.

(21) Appl. No.: 18/096,656

(22) Filed: Jan. 13, 2023

(65) Prior Publication Data

US 2023/0143675 A1 May 11, 2023

Related U.S. Application Data

(63) Continuation of application No. PCT/CN2021/105302, filed on Jul. 8, 2021.

(30) Foreign Application Priority Data

Jul. 13, 2020 (CN) .......................... 202010670865.4

(51) Int. Cl.
*H04W 4/00* (2018.01)
*H04W 72/1268* (2023.01)
*H04W 72/56* (2023.01)

(52) U.S. Cl.
CPC ....... *H04W 72/1268* (2013.01); *H04W 72/56* (2023.01)

(58) Field of Classification Search
CPC ............. H04W 72/1268; H04W 72/56; H04W 72/115; H04W 72/21; H04L 5/0055; H04L 1/0026; H04L 1/1864; H04L 5/0053; H04L 5/0094; H04L 1/1671

USPC ................................................ 370/329, 330
See application file for complete search history.

(56) References Cited

U.S. PATENT DOCUMENTS

| | | | |
|---|---|---|---|
| 2017/0318575 A1 | 11/2017 | Park et al. | |
| 2020/0403735 A1* | 12/2020 | Zhao | H04L 1/1896 |
| 2021/0058919 A1* | 2/2021 | Takeda | H04W 72/0446 |
| 2021/0058922 A1 | 2/2021 | Han et al. | |
| 2021/0321394 A1 | 10/2021 | Li et al. | |

(Continued)

FOREIGN PATENT DOCUMENTS

| | | |
|---|---|---|
| CN | 110474747 A | 11/2019 |
| CN | 110768773 A | 2/2020 |

(Continued)

OTHER PUBLICATIONS

Qualcomm Incorporated, Remaining issues for overlapping UL transmissions, Discussion/Decision, 3GPP TSG RAN WG1 Meeting #93, R1-1807359, May 21-25, 2018, Busan, Korea.

(Continued)

*Primary Examiner* — Chuong T Ho
(74) *Attorney, Agent, or Firm* — Price Heneveld LLP

(57) ABSTRACT

An information multiplexing method and apparatus, and user equipment are provided. The method includes: in a case that time domain resources for an uplink data channel and at least one uplink control channel overlap, multiplexing at least one UCI onto the uplink data channel, and coding the at least one UCI based on type information of the at least one UCI, where the at least one UCI is UCI carried on the at least one uplink control channel.

19 Claims, 7 Drawing Sheets

---

201 — In a case that time domain resources for an uplink data channel and at least one uplink control channel overlap, UE multiplexes at least one UCI onto the uplink data channel 202 — UE codes the at least one UCI based on type information of the at least one UCI

(56) References Cited

U.S. PATENT DOCUMENTS

| | | | | |
|---|---|---|---|---|
| 2021/0337538 A1* | 10/2021 | Li | ............... | H04L 5/0055 |
| 2021/0360648 A1* | 11/2021 | Zhang | ............ | H04W 52/346 |
| 2021/0377991 A1* | 12/2021 | Takeda | ........... | H04W 72/569 |
| 2022/0150918 A1* | 5/2022 | Xu | ................ | H04W 72/569 |

FOREIGN PATENT DOCUMENTS

| | | | |
|---|---|---|---|
| JP | 2017539124 A | 12/2017 |
| WO | 2019130521 A1 | 7/2019 |
| WO | 2019214468 A1 | 11/2019 |
| WO | 2020135214 A1 | 7/2020 |

OTHER PUBLICATIONS

Huawei, HiSilicon, UCI enhancements for URLLC, Discussion and Decision, 3GPP TSG RAN WG1 Meeting #96b, R1-1903955, Apr. 8- 12, 2019, Xi'an, China.

LG Electronics, "Discussion on configured grant for NR-U", 3GPP TSG RAN WG1 Meeting #99, R1-1912392, Nov. 18-22, 2019, Reno, USA.

Huawei, HiSilicon, "Discussion on UCI feedback for URLLC", 3GPP TSG RAN WG1 Ad Hoc Meeting, R1-1800054, Jan. 22-26, 2018, Vancouver, Canada.

Motorola Mobility, Lenovo, "UCI multiplexing in PUSCH repetition type B", 3GPP TSG RAN WG1 Meeting #100bis, R1-2002409, e-Meeting, Apr. 20-Apr. 30, 2020.

Apple Inc., "Final Summary of [101-e-NR-L1enh-URLLC-PUSCH-03] (AI 7.2.5.3)", 3GPP TSG-RAN WG1 Meeting #101-e, R1-2004741, e-Meeting, May 25-Jun. 5, 2020.

* cited by examiner

INFORMATION MULTIPLEXING METHOD AND APPARATUS, AND USER EQUIPMENT

CROSS-REFERENCE TO RELATED APPLICATIONS

This application is a continuation application of International Application No. PCT/CN2021/105302 filed on Jul. 8, 2021, which claims priority to Chinese Patent Application No. 202010670865.4, filed in China on Jul. 13, 2020, which are incorporated herein by reference in their entireties.

TECHNICAL FIELD

This application relates to the field of communication technology, and specifically, to an information multiplexing method and apparatus, and user equipment.

BACKGROUND

In anew radio (new radio, NR) system, user equipment (UE) can support different services. For example, the UE can support ultra-reliable and low latency services (URLLC services), and can also support large-capacity and high-speed services (eMBB services). However, because different channels have different start symbols and lengths, transmission resources may overlap in time domain.

Currently, in a case that time domain resources for a physical uplink control channel (PUCCH) and a physical uplink shared channel (PUSCH) that have a same priority overlap, the UE may multiplex uplink control information (UCI) onto the PUS CH for transmission. In a case that time domain resources for a PUCCH and a PUSCH that have different priorities overlap, the UE cancels transmission of the lower-priority channel, and transmits only the higher-priority channel.

However, for the PUCCH and the PUSCH that have different priorities, because the UE cancels the transmission of the lower-priority channel, UCI carried on the lower-priority channel cannot be transmitted, which reduces performance of uplink transmission.

SUMMARY

Embodiments of this application are intended to provide an information multiplexing method and apparatus, and user equipment.

According to a first aspect, an embodiment of this application provides an information multiplexing method applied to UE. The information multiplexing method includes: in a case that time domain resources for an uplink data channel and at least one uplink control channel overlap, multiplexing at least one UCI onto the uplink data channel, and coding the at least one UCI based on type information of the at least one UCI, where the at least one UCI is UCI carried on the at least one uplink control channel.

According to a second aspect, an embodiment of this application provides an information multiplexing apparatus. The information multiplexing apparatus includes a multiplexing module and a coding module. The multiplexing module is configured to: in a case that time domain resources for an uplink data channel and at least one uplink control channel overlap, multiplex at least one UCI onto the uplink data channel. The coding module is configured to code the at least one UCI based on type information of the at least one UCI. The at least one UCI is UCI carried on the at least one uplink control channel.

According to a third aspect, an embodiment of this application provides a UE, where the UE includes a processor, a memory, and a program or instructions stored in the memory and capable of running on the processor. When the program or the instructions are executed by the processor, the steps of the information multiplexing method according to the first aspect are implemented.

According to a fourth aspect, an embodiment of this application provides a readable storage medium, where the readable storage medium stores a program or instructions. When the program or the instructions are executed by a processor, the steps of the information multiplexing method according to the first aspect are implemented.

According to a fifth aspect, an embodiment of this application provides a chip, where the chip includes a processor and a communications interface, the communications interface is coupled to the processor, and the processor is configured to run a program or instructions to implement the information multiplexing method according to the first aspect.

In the embodiments of this application, in a case that time domain resources for an uplink data channel and at least one uplink control channel overlap, UE may multiplex at least one UCI onto the uplink data channel, and code the at least one UCI based on type information of the at least one UCI. For an uplink control channel and an uplink data channel that have different priorities, in a case that time domain resources for the uplink control channel and the uplink data channel overlap, the UE may multiplex the at least one UCI carried on the uplink control channel onto the uplink data channel, so as to implement transmission of the at least one UCI carried on the uplink data channel. In addition, the UE may code the UCIs based on the type information of the at least one UCI, that is, code the UCIs of different priorities to meet different transmission reliability requirements, thereby reducing impact on transmission performance of the uplink data channel. This can improve performance of uplink transmission.

DESCRIPTION OF EMBODIMENTS

Figure 1:
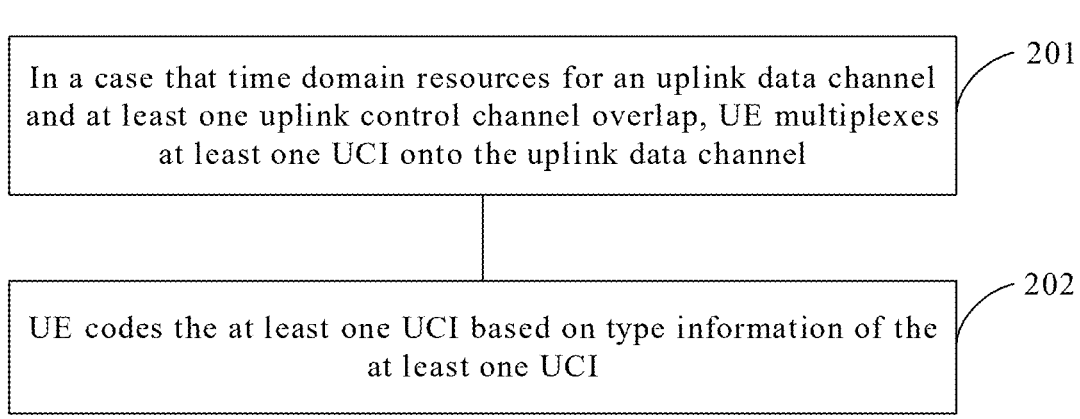
FIG. 1 is a schematic diagram of an information multiplexing method according to an embodiment of this application.

The following clearly and describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects instead of describing a specific order or sequence. It should be understood that a term used in this way may be interchangeable in an appropriate case, so that the embodiments of this application can be implemented in a sequence other than those shown or described herein. Objects distinguished by "first" and "second" are usually of one type, and a quantity of objects is not limited. For example, a first object may be one, or may be a plurality. In addition, in the specification and the claims, "and/or" represents at least one of the connected objects, and the character "/" usually represents an "or" relationship between the associated objects.

Some concepts and/or terms used in the information multiplexing method and apparatus and the user equipment that are provided in the embodiments of this application are explained below.

PUCCH and PUSCH collision handling:

For a PUCCH and a PUSCH that have a same priority, in a case that time domain resources for the PUCCH and the PUSCH overlap, UE multiplexes UCI onto the PUSCH for transmission. In addition, different types of UCI, such as hybrid automatic repeat request-acknowledge (HARQ-ACK) information, channel state information (CSI) part 1, and CSI part 2, have different reliability requirements, and different types of UCI are multiplexed onto PUSCHs at different bit rates. Therefore, different types of UCI need separate coding and separate mapping. In a case that time domain resources for a PUCCH and a PUSCH that have different priorities overlap, the UE cancels transmission of the lower-priority channel, and transmits only the higher-priority channel.

In a PUCCH group, regardless of whether the PUCCH and the PUSCH are in a same serving cell or different serving cells, simultaneous transmission of the PUCCH and the PUSCH is not supported. Therefore, in a case that the time domain resources for the PUCCH and the PUSCH overlap (including partial overlap and full overlap), if a specific time requirement is met, the UE drops (for example, if a scheduling request (SR) PUCCH and a PUSCH without uplink shared channel (UL-SCH) overlap, the UE drops the PUSCH and transmits the SR PUCCH) or multiplexes the UCI onto the PUSCH for transmission (for example, if a HARQ-ACK/CSI PUCCH and a PUSCH overlap, and the UE multiplexes the HARQ-ACK/CSI onto the PUSCH for transmission). Specifically, the UE first handles a collision between multiple PUCCHs so that there is one PUCCH or multiple non-overlapping PUCCHs. Then, the UE handles a collision between the PUCCH and the PUSCH. If the PUCCH overlaps with only one PUSCH, UCI (excluding SR) is multiplexed onto the PUSCH. If the PUCCH overlaps with only multiple PUSCHs, the UE selects, according to a corresponding rule, one PUSCH for multiplexing. The rules are as follows:

first priority: a PUSCH with A-CSI;
second priority: a PUSCH with an earliest start slot;
third priority: a dynamic scheduling PUSCH>a configured grant PUSCH or a semi-persistent on PUSCH;
fourth priority: a PUSCH in a serving cell having a small priority index>a PUSCH in a serving cell having a large priority index; and
fifth priority: a PUSCH transmitted earlier>a PUSCH transmitted later.

Priority Mechanisms of PUCCH and PUSCH in NR:

In NR, a UE can support different services at the same time, and different services correspond to different service requirements, such as delay and reliability. Therefore, a mechanism for marking a priority of a PUCCH/PUSCH channel has been introduced. Specifically, two physical layer priority levels, that is, a high priority and a low priority, are introduced. For example, priorities of an SR, a configured grant (CG) PUSCH, a semi-persistent scheduling (SPS) PDSCH, and a HARQ-ACK for release are configured by radio resource control (RRC) signaling. A PUCCH corresponding to periodic CSI (P-CSI) or semi-persistent CSI (SP-CSI) has a low priority, and priorities of a HARQ-ACK for dynamic scheduling PDSCH, a DG PUSCH, and a PUSCH corresponding to A-CSI/SP-CSI are indicated by corresponding scheduling DCI. A priority of the PUCCH is determined by a HARQ-ACK/SR/CSI carried on the PUCCH. In a case that time domain resources for different channels overlap, if the channels have a same priority, handling is performed according to a protocol-defined multiplexing rule. If the channels have different priorities, the UE drops lower-priority channels and transmits higher-priority channels. If some channels have a same priority and some have different priorities, the UE first performs handling according to a protocol-defined multiplexing rule, and then handles the channels that have different priorities. In addition, when the UE handles channels of different priorities, it takes time to drop lower-priority channels and transmit higher-priority channels. The protocol defines a dropping/canceling time requirement for the UE to handle channels of different priorities.

It should be noted that the technology described in embodiments of this application is not limited to a long term evolution (LTE)/LTE-advanced (LTE-A) system, and may also be used in various wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably. The described technology may be used in the above-mentioned systems and radio technologies, as well as other systems and radio technologies. However, in the following descriptions, a new radio (NR) system is described for an illustration purpose, and NR terms are used in most of the following descriptions. These technologies may also have other applications than application to an NR system, such as 6th Generation (6G) communications systems.

The UE in the embodiments of this application may also be referred to as a terminal device. The UE may be a terminal device such as a mobile phone, a tablet personal computer, a laptop computer, or referred to as a notebook computer, a personal digital assistant (PDA), a palmtop computer, a netbook, an ultra-mobile personal computer (UMPC), a mobile internet device (MID), a wearable device, an in-vehicle device (VUE), or a pedestrian terminal (PUE). The wearable device includes: a band, a headset, glasses, and the like. It should be noted that a specific type of the UE is not limited in the embodiments of this application.

The network device in the embodiments of this application may be a base station or a core network. The base station may be referred to as a node B, an evolved Node B, an access point, a base transceiver station (BTS), a radio base station, a basic service set (BSS), an extended service set (ESS), a B node, an evolved NodeB (eNB), a home NodeB, a home evolved NodeB, a WLAN access point, a Wi-Fi node, a transmission and reception point (TRP), or another suitable term in the field. Provided that a same technical effect is achieved, the base station is not limited to a specific technical word. It should be noted that in the embodiments of this application, only a base station in an NR system is used as an example, but a specific type of the base station is not limited.

With reference to the accompanying drawings, the following describes in detail the information multiplexing method provided in the embodiments of this application by using a specific embodiment and an application scenario thereof.

An embodiment of this application provides an information multiplexing method. FIG. 1 shows a flowchart of an information multiplexing method according to this embodiment of this application. The method may be applied to UE. As shown in FIG. 1, the information multiplexing method provided in this embodiment of this application may include the following step 201 and step 202.

Step 201: In a case that time domain resources for an uplink data channel and at least one uplink control channel overlap, the UE multiplexes at least one UCI onto the uplink data channel.

In this embodiment of this application, the at least one UCI is UCI carried on the at least one uplink control channel.

It should be noted that each of the at least one uplink control channel may carry one or more UCIs. The at least one UCI may be some or all UCI carried on the at least one uplink control channel. For example, in a case that the UCI carried on the at least one uplink control channel includes SR, the at least one UCI is a UCI, other than the SR, in the UCI carried on the at least one uplink control channel (that is, the at least one UCI is some of the UCI carried on the at least one uplink control channel).

It should be noted that the foregoing one or more UCIs indicate one or more UCI types, such as low-priority HARQ-ACK, CSI part 1, CSI part 2, and high-priority HARQ-ACK.

Optionally, in this embodiment of this application, the uplink control channel may be a PUCCH, and the uplink data channel may be a PUSCH.

Optionally, in this embodiment of this application, the at least one UCI includes at least one of the following types of information: first HARQ-ACK information, second HARQ-ACK information, first CSI, or second CSI. The first HARQ-ACK information and the second HARQ-ACK information have different priorities, and the first CSI and the second CSI are different parts of a CSI report.

Optionally, in this embodiment of this application, the at least one UCI includes the first HARQ-ACK information and the second HARQ-ACK information; the at least one UCI includes the first HARQ-ACK information, the second HARQ-ACK information, and the first CSI; or the at least one UCI includes the first HARQ-ACK information, the second HARQ-ACK information, the first CSI, and the second CSI.

It should be noted that the priority in this embodiment of this application refers to a physical layer priority or a priority index. For example, that the first HARQ-ACK information and the second HARQ-ACK information have different priorities may be understood as: the first HARQ-ACK information and the second HARQ-ACK information have different physical layer priorities, or the first HARQ-ACK information and the second HARQ-ACK information have different priority indexes.

Optionally, in this embodiment of this application, the priority of the first HARQ-ACK information is higher than the priority of the second HARQ-ACK information, the first CSI is the first part of the CSI report, and the second CSI is the second part of the CSI report.

It should be noted that the first HARQ-ACK information may be referred to as a high-priority HARQ-ACK (HP HARQ-ACK), and the second HARQ-ACK information may be referred to as a low-priority HARQ-ACK (LP HARQ-ACK). The first CSI may be referred to as CSI part 1, and the second CSI may be referred to as CSI part 2.

Optionally, in this embodiment of this application, in a case that all of the at least one uplink control channel have a different priority than the uplink data channel, and that time domain resources for the uplink data channel and the at least one uplink control channel overlap, the UE may multiplex the at least one UCI onto the uplink data channel. Alternatively, in a case that some of the at least one uplink control channel have a different priority than the uplink data channel, and that time domain resources for the uplink data channel and the at least one uplink control channel overlap, the UE may multiplex the at least one UCI onto the uplink data channel.

It should be noted that, that time domain resources for the uplink data channel and the at least one uplink control channel overlap may be understood as: time domain resources for the uplink data channel and the at least one uplink control channel fully overlap, or time domain resources for the uplink data channel and the at least one uplink control channel partially overlap.

It should be noted that the foregoing uplink data channel may be one or more uplink data channels. That the UE multiplexes the at least one UCI onto the uplink data channel may be understood as: the UE multiplexes the at least one UCI onto one uplink data channel in the uplink data channel, or multiplexes the at least one UCI onto the multiple uplink data channels in the uplink data channel.

Step 202: The UE codes the at least one UCI based on type information of the at least one UCI.

Optionally, in this embodiment of this application, the type information of the at least one UCI may include at least one of the following: a type quantity of the at least one UCI or an information type included in the at least one UCI (that is, specific information included in the at least one UCI).

Optionally, in this embodiment of this application, the foregoing type information includes at least type quantity. The foregoing step 202 may be specifically implemented through the following step 202a, step 202b, step 202c, or step 202d.

Step 202a: If the type quantity of the at least one UCI is less than or equal to a preset threshold, the UE performs separate coding on the at least one UCI.

Optionally, in this embodiment of this application, the foregoing preset threshold may be specified in a protocol or configured by a network device.

Optionally, in this embodiment of this application, if a type quantity of the UCI (for example, HP HARQ-ACK, LP HARQ-ACK, CSI part 1, and CSI part 2) that is multiplexed onto an uplink data channel is less than or equal to a preset threshold M (for example, M=3), separate coding is performed on HP HARQ-ACK and LP HARQ-ACK; otherwise, joint coding is performed on HP HARQ-ACK and LP HARQ-ACK.

Step 202b: If the type quantity of the at least one UCI is greater than the preset threshold, the UE performs joint coding on the at least one UCI.

Optionally, in this embodiment of this application, if a type quantity of the UCI (for example, HP HARQ-ACK, LP HARQ-ACK, CSI part 1, and CSI part 2) that is multiplexed onto an uplink data channel is greater than a preset threshold M (for example, M=3), joint coding is performed on HP HARQ-ACK and LP HARQ-ACK; otherwise, separate coding is performed on HP HARQ-ACK and LP HARQ-ACK.

Step 202c: If the type quantity of the at least one UCI is greater than a preset threshold, the UE performs joint coding on a part of UCI in the at least one UCI, and performs separate coding or joint coding on the other part of UCI in the at least one UCI.

Optionally, in this embodiment of this application, if a type quantity of the UCI (for example, HP HARQ-ACK, LP HARQ-ACK, CSI part 1, and CSI part 2) that is multiplexed onto an uplink data channel is greater than a preset threshold M (for example, M=3), joint coding is performed on HP HARQ-ACK and LP HARQ-ACK, and joint coding or separate coding is performed on CSI part 1 and CSI part 2.

Step 202d: If the type quantity of the at least one UCI is greater than a preset threshold, the UE discards N UCIs in the at least one UCI, and performs separate coding on the rest UCI in a case that a type quantity of the rest UCI is less than or equal to a preset threshold.

In this embodiment of this application, the rest UCI is UCI apart from the N UCIs in the at least one UCI, where N is a positive integer.

Optionally, in this embodiment of this application, if the type quantity of the UCI (for example, HP HARQ-ACK, LP HARQ-ACK, CSI part 1, and CSI part 2) that is multiplexed onto the uplink data channel is greater than the preset threshold M (for example, M=3), low-priority UCI is dropped until a type quantity of the rest UCI is less than or equal to M, separate coding is performed on the HP HARQ-ACK and the LP HARQ-ACK.

Optionally, in this embodiment of this application, the foregoing step 202d may be specifically implemented through the following step 202d1.

Step 202d1: If the type quantity of the at least one UCI is greater than the preset threshold, the UE sequentially drops N UCIs in the at least one UCI according to a preset sequence.

In this embodiment of this application, the foregoing preset sequence is a dropping sequence of the at least one UCI.

Optionally, in this embodiment of this application, the at least one UCI is discarded in the following sequence: the second CSI, the first CSI, the second HARQ-ACK information, and the first HARQ-ACK information.

Optionally, in this embodiment of this application, the first HARQ-ACK information (and/or the second HARQ-ACK information) may include one or more HARQ-ACK codebooks.

Figure 2:
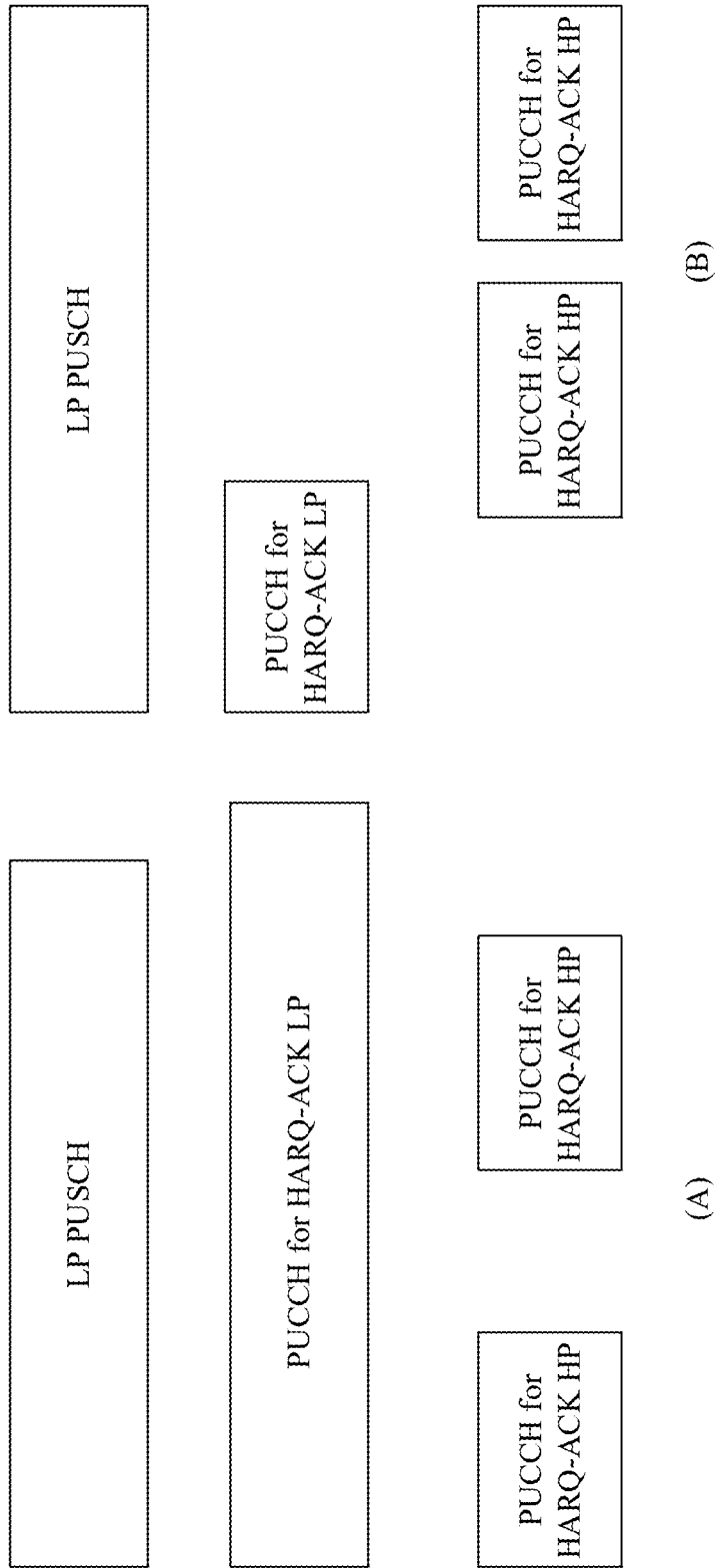
FIG. 2 is a first schematic diagram of an example in which resources for a PUCCH and a PUSCH overlap according to an embodiment of this application.

For example, as shown in (A) of FIG. 2, when two HARQ-ACK codebooks are configured for the UE, one HARQ-ACK codebook is at a slot level (low priority), and the other HARQ-ACK codebook is at a sub-slot level (high priority). Time domain resources for the three HARQ-ACK PUCCHs all overlap with a time resource for the PUSCH. In a case that time domain resources for multiple high-priority PUCCHs and one low-priority PUCCH overlap, the UE may multiplex the multiple high-priority PUCCHs with the one low-priority PUCCH, and the multiplexed PUCCH may carry multiple high-priority HARQ-ACK codebooks. If the multiplexed PUCCH overlaps with the PUSCH, the multiple HARQ-ACK codebooks are multiplexed onto the PUSCH, or the UE directly multiplexes the HARQ-ACKs carried by the three PUCCHs onto the PUSCH. As shown in (B) of FIG. 2, time domain resources for two high-priority PUCCHs and one LP PUCCH all overlap with a time domain resource for one LP PUSCH. The UE may multiplex HARQ-ACKs carried by the three PUCCHs onto the LP PUSCH. In this case, an LP HARQ-ACK includes two HARQ-ACK codebooks.

Optionally, in an implementation of this embodiment of this application, the foregoing at least one UCI includes the first HARQ-ACK information and the second HARQ-ACK information. The foregoing step 202 may be specifically implemented through the following step 202e, step 202f, or step 202g.

Step 202e: If the at least one UCI includes the first HARQ-ACK information and the second HARQ-ACK information, in a case that the type quantity of the at least one UCI is less than or equal to the preset threshold, the UE performs separate coding on the first HARQ-ACK information and the second HARQ-ACK information.

Step 202f: If the at least one UCI includes the first HARQ-ACK information and the second HARQ-ACK information, the UE performs separate coding or joint coding on the first HARQ-ACK information and the second HARQ-ACK information based on configuration information of the network device.

It can be understood that in a case that the network device configures separate coding for the first HARQ-ACK information and the second HARQ-ACK information, the UE may perform separate coding on the first HARQ-ACK information and the second HARQ-ACK information. In a case that the network device configures joint coding for the first HARQ-ACK information and the second HARQ-ACK information, the UE may perform joint coding on the first HARQ-ACK information and the second HARQ-ACK information.

Step 202g: If the at least one UCI includes the first HARQ-ACK information and the second HARQ-ACK information, the UE performs separate coding or joint coding on the first HARQ-ACK information and the second HARQ-ACK information based on first information respectively corresponding to the first HARQ-ACK information and the second HARQ-ACK information.

In this embodiment of this application, the foregoing first information includes at least one of the following: bit quantity, quantity of resource elements (RE) required for coding, or offset.

Optionally, in this embodiment of this application, the UE may determine, based on a bit quantity of HARQ-ACKs, whether separate coding or joint coding is performed on the HP HARQ-ACK and the LP HARQ-ACK. For example, in a case that the bit quantity of the HP HARQ-ACK is less than N1, and/or, that a bit quantity of the LP HARQ-ACK is greater than N2, and/or, that an absolute value of a difference between the bit quantity of the LP HARQ-ACK and the bit quantity of the HP HARQ-ACK is greater than N3, and/or, that a sum of the bit quantity of the LP HARQ-ACK and the bit quantity of the HP HARQ-ACK is greater than N4, the UE may perform joint coding on the HP HARQ-ACK and the LP HARQ-ACK. Otherwise, the UE performs separate coding on the HP HARQ-ACK and the LP HARQ-ACK.

Optionally, in this embodiment of this application, the UE may determine, based on a quantity of REs required for performing separate coding on the HP HARQ-ACK and the LP HARQ-ACK, whether to perform separate coding or joint coding.

Optionally, in this embodiment of this application, the UE may determine, based on β offsets (beta offset) respectively corresponding to the HP HARQ-ACK and the LP HARQ-ACK, whether to perform separate coding or joint coding. The offset is used to determine a quantity of REs that are occupied for multiplexing the UCI onto the PUSCH or a quantity of coded modulation symbols per layer when the UCI is transmitted on the PUSCH.

Optionally, in this embodiment of this application, in a case that the UCI is multiplexed on the PUSCH, the UE may determine, based on a bit quantity of the UCI, a parameter β offset, and/or a (alpha), a quantity of coded modulation symbols per layer when the UCI is multiplexed onto the PUSCH.

It should be noted that, for the β offset, in a case of same-priority multiplexing, the β offset may be configured by RRC or indicated by downlink control information (DCI), and α is configured by RRC. When different-priority multiplexing is supported, the β offsets may be classified as follows:

(1) In a case of semi-persistent configuration: a β offset for multiplexing of same priority (beta offset for multiplexing of same priority); a β offset for multiplexing of HP UCI on LP PUSCH (beta offset for multiplexing of HP UCI on LP PUSCH); and a β offset for multiplexing of LP UCI on HP PUSCH (beta offset for multiplexing of LP UCI on HP PUSCH); and (2) In a case of DCI indication: a β offset for multiplexing of same priority; and a β offset for multiplexing of the other priority (beta offset for multiplexing of the other priority). For example, if a PUSCH has a low priority, DCI needs to indicate an offset for multiplexing of low-priority UCI on the PUSCH and an offset for multiplexing of high-priority UCI on the PUSCH.

Optionally, in another implementation of this embodiment of this application, the foregoing at least one UCI includes the first HARQ-ACK information, the second HARQ-ACK information, and the first CSI. The foregoing step 202 may be specifically implemented through the following step 202h.

Step 202h: If the at least one UCI includes the first HARQ-ACK information, the second HARQ-ACK information, and the first CSI, the UE performs separate coding on the first HARQ-ACK information, the second HARQ-ACK information, and the first CSI.

Optionally, in another implementation of this embodiment of this application, the at least one UCI includes the first HARQ-ACK information, the second HARQ-ACK information, the first CSI, and the second CSI. The foregoing step 202 may be specifically implemented through the following step 202i or step 202j.

Step 202i: If the at least one UCI includes the first HARQ-ACK information, the second HARQ-ACK information, the first CSI, and the second CSI, the UE drops the second CSI, and performs separate coding on the first HARQ-ACK information, the second HARQ-ACK information, and the first CSI.

Step 202j: If the at least one UCI includes the first HARQ-ACK information, the second HARQ-ACK information, the first CSI, and the second CSI, the UE performs joint coding on the first HARQ-ACK information and the second HARQ-ACK information, and performs separate coding on the first CSI and the second CSI.

Optionally, in this embodiment of this application, a coding manner of the first HARQ-ACK information, the second HARQ-ACK information, the first CSI, and the second CSI is: mapping a coded modulation symbol of the first HARQ-ACK information to an RE on the uplink data channel according to a first preset manner, and mapping a coded modulation symbol of the first CSI to an RE on the uplink data channel according to a second preset manner, where the second HARQ-ACK information is mapped to behind the first CSI, and the second HARQ-ACK information is mapped to behind the first CSI or the second CSI.

Optionally, in this embodiment of this application, a coding manner of the first HARQ-ACK information, the second HARQ-ACK information, the first CSI, and the second CSI is: respectively mapping a coded modulation symbol of the first HARQ-ACK information and a coded modulation symbol of the second HARQ-ACK information to REs on the uplink data channel according to a first preset manner, where the second HARQ-ACK information is mapped to behind the first HARQ-ACK information.

Optionally, in this embodiment of this application, a coding manner of the first HARQ-ACK information, the second HARQ-ACK information, the first CSI, and the second CSI is: mapping a coded modulation symbol of the first HARQ-ACK information to an RE on the uplink data channel according to a first preset manner, and mapping a coded modulation symbol of the second HARQ-ACK information to an RE on the uplink data channel according to a second preset manner.

Optionally, in this embodiment of this application, the first preset manner may: mapping the UCI (for example, the first HARQ-ACK information, the second HARQ-ACK information, and the CG-UCI) starting from a first non-DMRS symbol that is after a first demodulation reference signal (DMRS). The second preset manner may be: performing mapping (for example, the first CSI and the second CSI) starting from a first non-DMRS symbol, where no symbol can be mapped to the RE to which the UCI is mapped according to the first preset manner. If multiple UCIs are to be mapped according to the first (or second) preset manner, the later-mapped UCI cannot be mapped to an RE in which the earlier-mapped UCI is located.

The following describes in detail, by using specific embodiments and drawing, methods for multiplexing multiple types of UCI onto an uplink data channel in an embodiment of this application.

Figure 3:
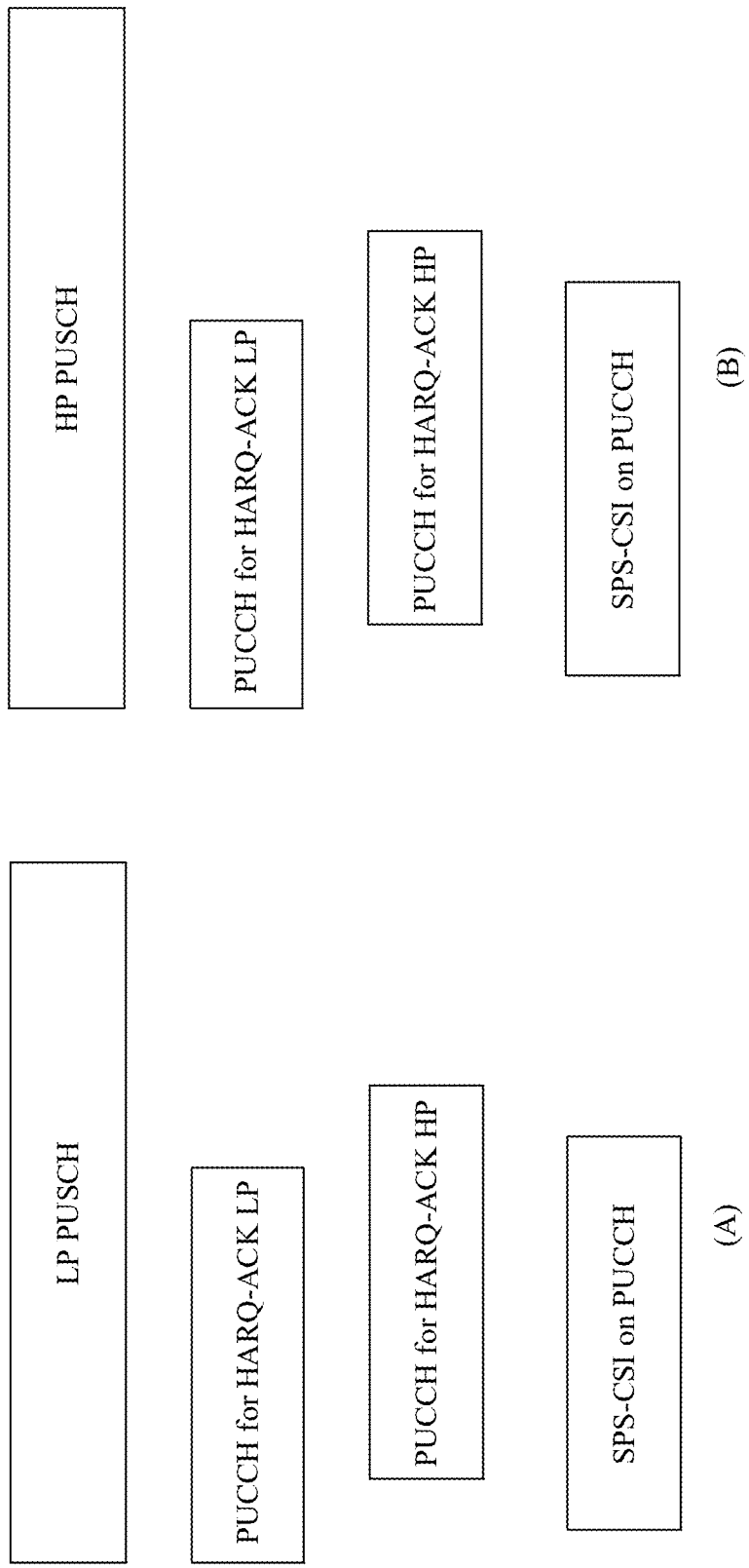
FIG. 3 is a second schematic diagram of an example in which resources for a PUCCH and a PUSCH overlap according to an embodiment of this application.

As shown in (A) of FIG. 3, time-domain resources for a PUCCH for low-priority HARQ-ACK, a PUCCH for high-priority HARQ-ACK, and a CSI PUCCH (where CSI includes CSI part 1 and CSI part 2) all overlap with a time-domain resource for a low-priority PUSCH. According to the related art, the UE multiplexes the low-priority HARQ-ACK and the CSI onto a PUCCH (for example, PUCCH1). If time domain resources for PUCCH1 and PUSCH still overlap, the UE multiplexes the low-priority HARQ-ACK and the CSI onto the PUSCH. Because the time domain resources for the LP PUSCH and the HP HARQ-ACK PUCCH overlap, the UE cancels transmission of the LP PUSCH and transmits only the PUCCH for HP HARQ-ACK. In other words, in this case, transmissions of the LP HARQ-ACK, the CSI, and the PUSCH are all canceled due to transmission of only the PUCCH for HP HARQ-ACK, so that an LP service is greatly affected.

As shown in (B) of FIG. 3, time-domain resources for a PUCCH for low-priority HARQ-ACK, a PUCCH for high-priority HARQ-ACK, and a CSI PUCCH (where CSI includes CSI part 1 and CSI part 2) all overlap with a time-domain resource for a high-priority PUSCH. According to the related art, the UE multiplexes the low-priority HARQ-ACK and the CSI onto a PUCCH (for example, PUCCH1). If time domain resources for the PUCCH1 and the PUSCH/PUCCH for HP HARQ-ACK still overlap, the UE cancels the transmission of the PUCCH1 that carries the low-priority HARQ-ACK and the CSI. Because the time domain resources for the HP PUSCH and the PUCCH for HP HARQ-ACK overlap, the UE multiplexes the HP HARQ-ACK onto the PUSCH for transmission. In other words, in this case, transmissions of the LP HARQ-ACK and the CSI are all canceled due to transmission of only the HP HARQ-ACK PUCCH or HP PUSCH, so that an LP service is greatly affected.

Figure 4:
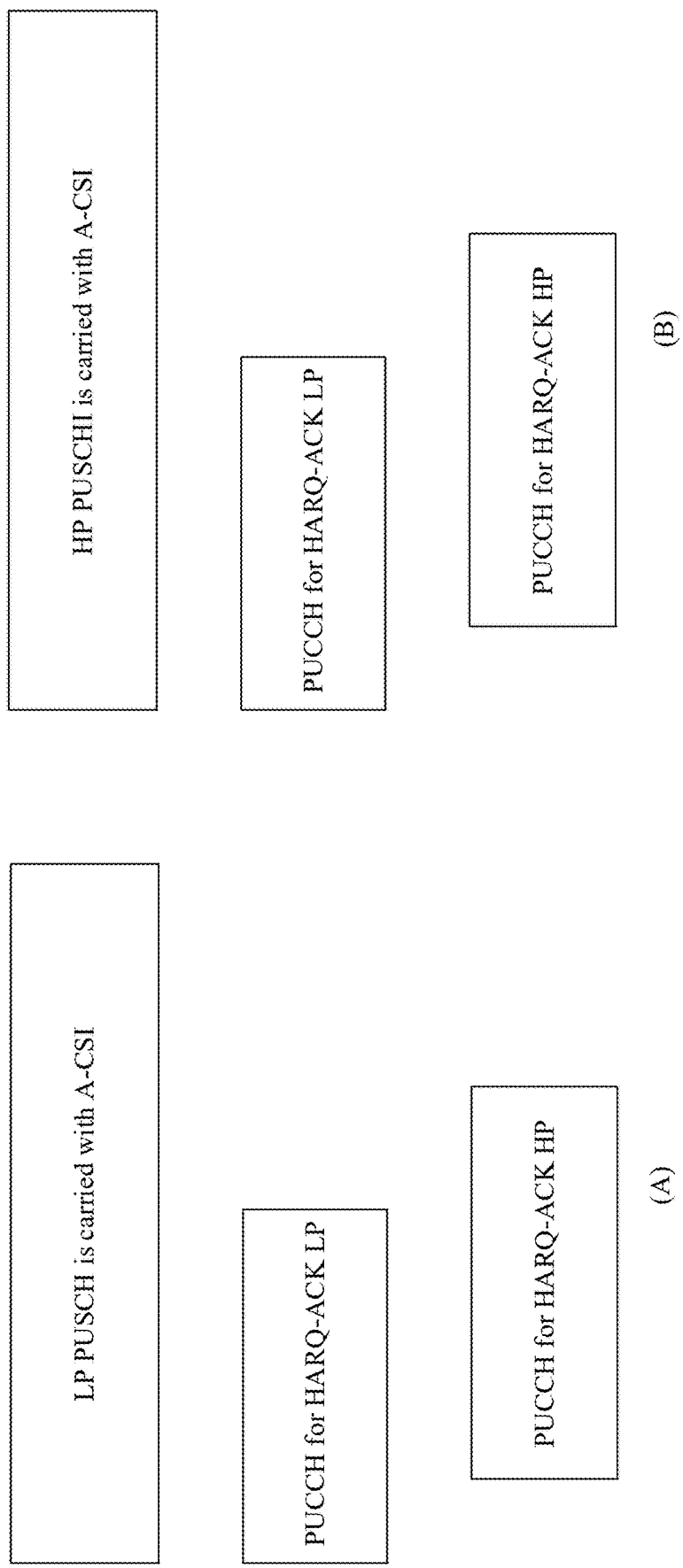
FIG. 4 is a third schematic diagram of an example in which resources for a PUCCH and a PUSCH overlap according to an embodiment of this application.

As shown in FIG. 4, when the base station schedules a PUSCH, the A-CSI is triggered, and time domain resources for the PUSCH, an LP HARQ-ACK, and an HP HARQ-ACK overlap. In (A) of FIG. 4, according to the related art, the LP HARQ-ACK is multiplexed onto the PUSCH. However, because the time domain resources for the PUSCH and the PUCCH for HP HARQ-ACK overlap, transmission of the LP PUSCH is canceled, so that an LP service is greatly affected. In (B) of FIG. 4, according to the related art, the HP HARQ-ACK is multiplexed onto the HP PUSCH for transmission, and transmission of the PUCCH for LP HARQ-ACK is canceled, so that an LP service is greatly affected.

In this embodiment of this application, to reduce impact on the LP service, multiplexing can be supported for uplink transmissions of different priorities. In addition, in this case (that is, multiplexing is supported for uplink transmissions of different priorities), the UE may multiplex the foregoing HP HARQ-ACK, LP HARQ-ACK, and CSI onto the PUSCH. Specifically, the multiplexing method is any one of the following methods (method 1 to method 3):

Method 1: The HP HARQ-ACK, the LP HARQ-ACK, and the CSI are all multiplexed onto the PUSCH. If the CSI includes CSI part 2, the CSI part 2 is dropped, and separate coding is performed on the HP HARQ-ACK, the LP HARQ-ACK, and the CSI part 1.

A sequence of mapping coded modulation symbols of the HP HARQ-ACK, LP HARQ-ACK, and CSI part 1 to REs on the PUSCH is any one of the following manners (manner 1 to manner 3):

Manner 1: The HP HARQ-ACK may be mapped starting from a first non-DMRS symbol that is after a first DMRS, and the LP HARQ-ACK and the CSI part 1 are mapped starting from a first non-DMRS symbol. The CSI part 1 is mapped to behind the LP HARQ-ACK, and the LP HARQ-ACK and the CSI part 1 cannot be mapped to an RE in which the HP HARQ-ACK is located.

Manner 2: The HP HARQ-ACK and the LP HARQ-ACK may be mapped starting from a first non-DMRS symbol that is after a first DMRS. The LP HARQ-ACK is mapped to behind the HP HARQ-ACK, the CSI part 1 may be mapped starting from a first non-DMRS symbol, and the CSI part 1 cannot be mapped to an RE in which the HARQ-ACK is located.

Manner 3: The HP HARQ-ACK may be mapped starting from a first non-DMRS symbol that is after a first DMRS, the LP HARQ-ACK may be mapped starting from a first non-DMRS symbol, and the CSI part 1 is mapped from the first non-DMRS symbol. The LP HARQ-ACK is mapped to behind the CSI part 1, and the CSI part 1 and the LP HARQ-ACK cannot be mapped to an RE in which the HP HARQ-ACK is located.

It should be noted that in a case that the CSI part 2 is dropped or that the UCI does not include the CSI part 2, separate mapping may be performed on the HP HARQ-ACK, the LP HARQ-ACK, and the CSI part 1 in the foregoing manner 1, manner 2, or manner 3.

It should be noted that in a case that the UCI does not include the CSI part 1, the UCI includes only the HP HARQ-ACK and the LP HARQ-ACK, separate mapping may be performed on the HARQ-ACK and the LP HARQ-ACK in the foregoing manner 1, manner 2, or manner 3 (the CSI part 1 does not exist, and no mapping is required). That is, in the foregoing mapping manners, if the UCI multiplexed onto the PUSCH does not include some types of UCI/some UCI, the UE may still map the UCI according to the foregoing mapping sequence, and only skip mapping of the UCI that is not included.

Method 2: The HP HARQ-ACK, the LP HARQ-ACK, and the CSI are all multiplexed onto the PUSCH, joint coding is performed on the HP HARQ-ACK and the LP HARQ-ACK, and separate coding is performed on the CSI part 1 and the CSI part 2.

Method 3: The HP HARQ-ACK, the LP HARQ-ACK, and the CSI are all multiplexed onto the PUSCH. If the CSI includes the CSI part 2, joint coding is performed on the HP HARQ-ACK and the LP HARQ-ACK, and separate coding is performed on the CSI part 1 and the CSI part 2. If the CSI does not include the CSI part 2, separate coding is performed on the HP HARQ-ACK, the LP HARQ-ACK, and the CSI part 1.

In a case that separate coding is performed on the HP HARQ-ACK and the LP HARQ-ACK, a sequence of mapping coded modulation symbols of the HP HARQ-ACK, the LP HARQ-ACK, and the CSI part 1 to REs on the PUSCH is any one of the foregoing manner 1 to manner 3.

Optionally, in still another implementation of this embodiment of this application, the uplink data channel carries CG-UCI, and the at least one UCI includes the first HARQ-ACK information and the second HARQ-ACK information. The foregoing step 202 may be specifically implemented through the following step 202k, step 202l, or step 202m.

Step 202k: If the at least one UCI includes the first HARQ-ACK information and the second HARQ-ACK information, the UE performs joint coding on the first HARQ-ACK information, the second HARQ-ACK information, and the CG-UCI.

Step 202l: If the at least one UCI includes the first HARQ-ACK information and the second HARQ-ACK information, in a case that a priority of the CG-UCI is the same as the priority of the first HARQ-ACK information, the UE performs joint coding on the first HARQ-ACK information and the CG-UCI, and performs separate coding on the second HARQ-ACK information.

Optionally, in this embodiment of this application, the priority of the CG-UCI is the same as a priority of the uplink data channel, or the priority of the CG-UCI is configured by the network device.

Optionally, in this embodiment of this application, in a case that the CG-PUSCH has a low priority (LP), the UE may perform joint coding on the CG-UCI and the LP HARQ-ACK, and perform separate coding the HP HARQ-ACK. In a case that the CG-PUSCH has a high priority (HP), the UE may perform joint coding on the CG-UCI and the HP HARQ-ACK, and perform separate coding on the LP HARQ-ACK.

Step 202m: If the at least one UCI includes the first HARQ-ACK information and the second HARQ-ACK information, in a case that a priority of the CG-UCI is the same as the priority of the second HARQ-ACK information, the UE performs joint coding on the second HARQ-ACK information and the CG-UCI, and performs separate coding on the first HARQ-ACK information.

Optionally, in this embodiment of this application, in a case that a type quantity of the UCI (for example, CG-UCI, HP HARQ-ACK, LP HARQ-ACK, CSI part 1, and CSI part 2) that is multiplexed onto the uplink data channel is less than or equal to a preset threshold M (for example, M=3), separate coding is performed on HP HARQ-ACK and LP HARQ-ACK; otherwise, joint coding is performed on HP HARQ-ACK and LP HARQ-ACK.

Optionally, in yet another implementation of this embodiment of this application, the uplink data channel carries CG-UCI, and the at least one UCI includes the first HARQ-ACK information, the second HARQ-ACK information, the first CSI, and the second CSI. The foregoing step 202 may be specifically implemented through the following step 202n, step 202o, step 202p, or step 202q.

Step 202n: If the at least one UCI includes the first HARQ-ACK information, the second HARQ-ACK information, the first CSI, and the second CSI, the UE drops the second CSI, performs joint coding on the first HARQ-ACK information and the second HARQ-ACK information, and performs separate coding on the first CSI and the CG-UCI.

Step 202o: If the at least one UCI includes the first HARQ-ACK information, the second HARQ-ACK information, the first CSI, and the second CSI, the UE drops the second CSI, and in a case that a priority of the CG-UCI is the same as the priority of the first HARQ-ACK information, performs separate coding on the first HARQ-ACK information and the CG-UCI, and performs separate coding on the second HARQ-ACK information and the first CSI.

Step 202p: If the at least one UCI includes the first HARQ-ACK information, the second HARQ-ACK information, the first CSI, and the second CSI, the UE drops the second CSI, and in a case that a priority of the CG-UCI is the same as the priority of the second HARQ-ACK information, performs joint coding on the second HARQ-ACK information and the CG-UCI, and performs separate coding on the first HARQ-ACK information and the first CSI.

Step 202q: If the at least one UCI includes the first HARQ-ACK information, the second HARQ-ACK information, the first CSI, and the second CSI, the UE drops the first CSI and the second CSI, and performs separate coding on the first HARQ-ACK information, the second HARQ-ACK information, and the CG-UCI.

Optionally, in this embodiment of this application, the coding manner of the first HARQ-ACK information, the second HARQ-ACK information, the first CSI, and the CG-UCI is: mapping the coded modulation symbol of the CG-UCI to an RE on the uplink data channel according to a first preset manner, and respectively mapping the coded modulation symbol of the first HARQ-ACK information and the coded modulation symbol of the first CSI to REs on the uplink data channel according to a second preset manner, where the second HARQ-ACK information is mapped to behind the first CSI.

Optionally, in this embodiment of this application, the coding manner of the first HARQ-ACK information, the second HARQ-ACK information, the first CSI, and the CG-UCI is: separately mapping the code modulation symbol of the first HARQ-ACK information, the code modulation symbol of the second HARQ-ACK information, and the coded modulation symbol of the CG-UCI to REs on the uplink data channel according to a first preset manner, where the first HARQ-ACK information and the second HARQ-ACK information are mapped to behind the CG-UCI, and the second HARQ-ACK information is mapped to behind the first HARQ-ACK information.

Optionally, in this embodiment of this application, the coding manner of the first HARQ-ACK information, the second HARQ-ACK information, the first CSI, and the CG-UCI is: mapping the coded modulation symbol of the first HARQ-ACK information to an RE on the uplink data channel according to a first preset manner, and mapping the coded modulation symbol of the CG-UCI to an RE on the uplink data channel according to a second preset manner, where the second HARQ-ACK information is mapped to behind the first CSI.

The following describes in detail, by using specific embodiments and drawings, methods for multiplexing UCI onto an uplink data channel that carries CG-UCI in an embodiment of this application.

In the related art, in a case that a CG-PUSCH is configured to be transmitted on an unlicensed frequency band, the CG-UCI needs to be carried for each transmission of the CG-PUSCH. For example, when a higher-layer parameter CG-UCI-Multiplexing is configured, a HARQ-ACKs of a same priority are allowed to be multiplexed onto the CG-PUSCH, and joint coding is performed on HARQ-ACK and CG-UCI. Otherwise, multiplexing of the HARQ-ACK on the CG-PUSCH is not supported, and in a case that time domain resources for the CG-PUSCH and the HARQ-ACK PUCCH overlap, the UE skips transmission of the CG-PUSCH, and transmits only the HARQ-ACK PUCCH.

Figure 5:
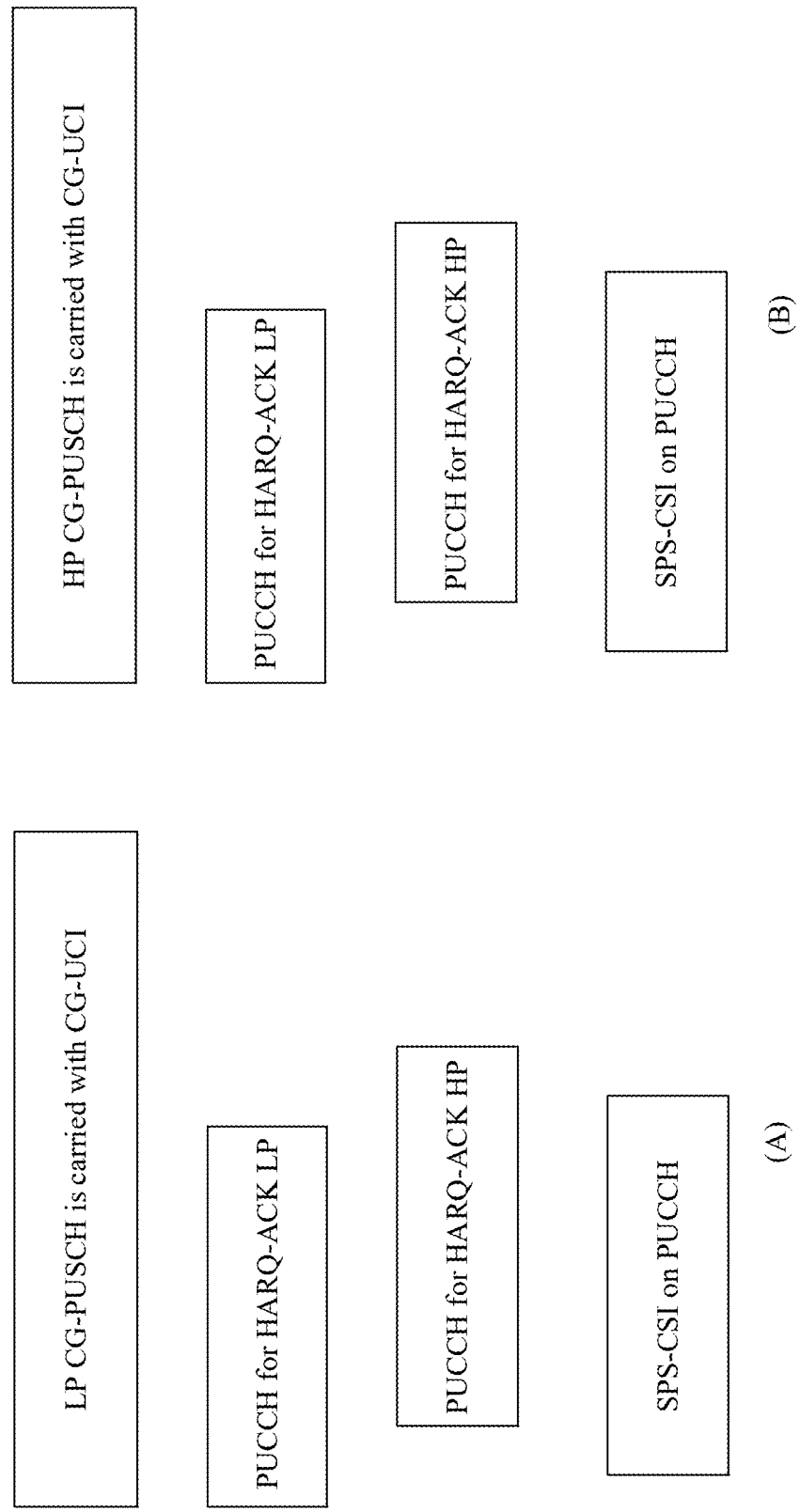
FIG. 5 is a fourth schematic diagram of an example in which resources for a PUCCH and a PUSCH overlap according to an embodiment of this application.

As shown in (A) of FIG. 5, the LP HARQ-ACK and the CSI are multiplexed onto one PUCCH (for example, PUCCH1). If time domain resources for the PUCCH1 and the CG-PUSCH overlap, the UE may determine, based on whether cg-CG-UCI-Multiplexing is configured, whether to multiplex the HARQ-ACK and the CSI onto the PUSCH or transmit the PUCCH1. However, because time domain resources for the PUSCH and the PUCCH1 overlap with a time-domain resource for the HP HARQ-ACK, none of the LP HARQ-ACK, the CSI, and the CG-PUSCH can be transmitted, and the UE transmits only the PUCCH for HP HARQ-ACK.

As shown in (B) of FIG. 5, the LP HARQ-ACK and the CSI are multiplexed onto one PUCCH (for example, PUCCH1). If time domain resources for the PUCCH1 and the CG-PUSCH/HP HARQ-ACK overlap, the UE may cancel the transmission of PUCCH1. The UE determines, based on whether the cg-CG-UCI-Multiplexing is configured, whether to multiplex the HP HARQ-ACK onto the CG PUSCH or transmit the HP HARQ-ACK PUCCH.

In this embodiment of this application, in a case that multiplexing is supported for uplink transmissions of different priorities, the UE may multiplex the foregoing HP HARQ-ACK, LP HARQ-ACK, and CSI onto the CG-PUSCH. Specifically, the multiplexing method is any one of the following methods (method 4 to method 6):

Method 4: Joint coding is performed on HP HARQ-ACK, LP HARQ-ACK, and CG-UCI.

Method 5: If there is no CSI part 2, the UE may perform joint coding on the CG-UCI and the HP HARQ-ACK that has a same priority as the CG-UCI, and perform separate coding on the HARQ-ACK that has another priority (that is, the LP HARQ-ACK).

It can be understood that if a priority of the CG-PUSCH is LP, joint coding may be performed on the CG-UCI and the LP HARQ-ACK, and separate coding is performed on the HP HARQ-ACK. If the priority of the CG-PUSCH is HP, joint coding may be performed on the CG-UCI and the HP HARQ-ACK, and separate coding is performed on the LP HARQ-ACK.

Optionally, if there is CSI part 2, the UE may drop the CSI part 2, perform joint coding on the CG-UCI and the HP HARQ-ACK that has a same priority as the CG-UCI, and perform separate coding on the HARQ-ACK that has another priority (that is, the LP HARQ-ACK). Alternatively, the UE may drop the CSI part 1 and the CSI part 2, and perform separate coding on the HP HARQ-ACK, the LP HARQ-ACK, and the CG-UCI.

In a case that separate coding is performed on the HP HARQ-ACK and the LP HARQ-ACK, a sequence of mapping the coded modulation symbols of the HP HARQ-ACK, the LP HARQ-ACK, the CG-UCI, and the CSI part 1 to REs on the PUSCH is any one of manner 1 to manner 3 in the foregoing embodiment.

Method 6: The UE drops the CSI part 1 and the CSI part 2, and performs separate coding on the HP HARQ-ACK, the LP HARQ-ACK, and the CG-UCI.

A sequence of mapping the coded modulation symbols of the HP HARQ-ACK, the LP HARQ-ACK, and the CG-UCI to REs on the PUSCH is any one of the following manners (manner 4 to manner 6):

Manner 4: The CG-UCI may be mapped starting from a first non-DMRS symbol that is after a first DMRS, the HP HARQ-ACK is mapped starting from a first non-DMRS symbol, and the LP HRQ-ACK is mapped starting from the first non-DMRS symbol, where the LP HARQ-ACK cannot be mapped to REs in which the CG-UCI and the HP HARQ-ACK are located.

Manner 5: The CG-UCI, the HP HARQ-ACK, and the LP HARQ-ACK are separately mapped starting from a first non-DMRS symbol that is after the DMRS. The CG-UCI, the HP HARQ-ACK, and the LP HARQ-ACK may be mapped according to different sequences. For example, (1) the CG-UCI is first mapped, the HP HARQ-ACK is mapped to behind the CG-UCI, and the LP HARQ-ACK is mapped to behind the HP HARQ-ACK; (2) the HP HARQ-ACK is first mapped, the CG-UCI is mapped to behind the HP HARQ-ACK, and the LP HARQ-ACK is mapped to behind the CG-UCI; and (3) the HP HARQ-ACK is first mapped, the LP HARQ-ACK is mapped to behind the HP HARQ-ACK, and the CG-UCI is mapped to behind the LP HARQ-ACK.

Manner 6: The HP HARQ-ACK is mapped starting from a first non-DMRS symbol that is after a first DMRS, the CG-UCI is mapped starting from a first non-DMRS symbol, and the LP HARQ-ACK is mapped starting from the first non-DMRS symbol, where the LP HARQ-ACK is mapped to behind the CSI part 1, and the LP HARQ-ACK and the CSI part 1 cannot be mapped to an RE in which the HP HARQ-ACK is located.

It should be noted that, in a case that a priority of the CG-UCI is a low priority, separate coding may be performed on the HP HARQ-ACK, the LP HARQ-ACK, and the CG-UCI according to the foregoing manner 5 or manner 6. In a case that a priority of the CG-UCI is a high priority, separate coding may be performed on the HP HARQ-ACK, the LP HARQ-ACK, and the CG-UCI according to the foregoing manner 4 or manner 5.

The embodiment of this application provides an information multiplexing method. In a case that time domain resources for an uplink data channel and at least one uplink control channel overlap, UE may multiplex at least one UCI onto the uplink data channel, and code the at least one UCI based on type information of the at least one UCI. For an uplink control channel and an uplink data channel that have different priorities, in a case that time domain resources for the uplink control channel and the uplink data channel overlap, the UE may multiplex the at least one UCI carried on the uplink control channel onto the uplink data channel, so as to implement transmission of the at least one UCI carried on the uplink data channel. In addition, the UE may code the UCIs based on the type information of the at least one UCI, that is, code the UCIs of different priorities to meet different transmission reliability requirements, thereby reducing impact on transmission performance of the uplink data channel. This can improve performance of uplink transmission.

It should be noted that the information multiplexing method provided in this embodiment of this application may be executed by UE, an information multiplexing apparatus, or a control module that is in the information multiplexing apparatus and that is configured to perform the information multiplexing method. In this embodiment of this application, an example in which the UE performs or loads the information multiplexing method is used to describe the information multiplexing method provided in this embodiment of this application.

Figure 6:
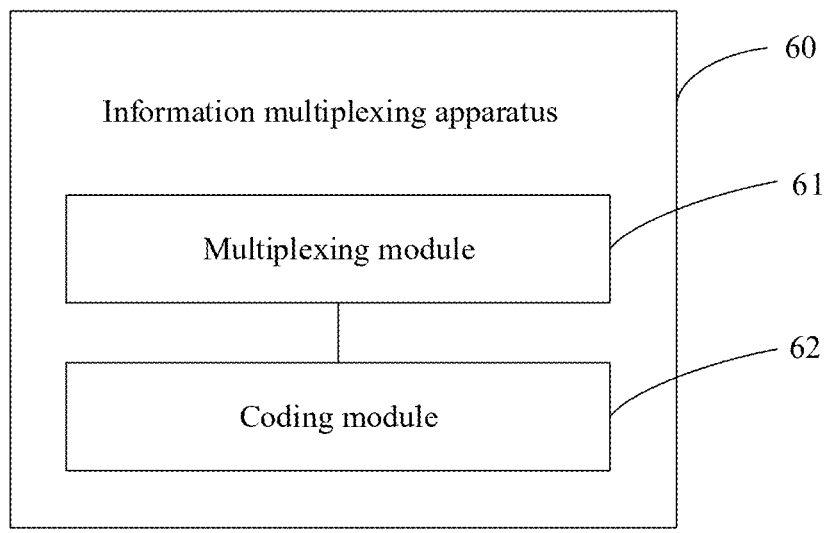
FIG. 6 is a schematic diagram of a structure of an information receiving apparatus according to an embodiment of this application.

FIG. 6 is a possible schematic diagram of a structure of an information multiplexing apparatus according to an embodiment of this application. As shown in FIG. 6, the information multiplexing apparatus 60 may include a multiplexing module 61 and a coding module 62.

The multiplexing module 61 is configured to: in a case that time domain resources for an uplink data channel and at least one uplink control channel overlap, multiplex at least one UCI onto the uplink data channel. The coding module 62 is configured to code the at least one UCI based on type information of the at least one UCI. The at least one UCI is UCI carried on the at least one uplink control channel.

In a possible implementation, the type information includes at least a type quantity. The coding module 62 is specifically configured to: if the type quantity of the at least one UCI is less than or equal to a preset threshold, perform separate coding on the at least one UCI; or if the type quantity of the at least one UCI is greater than a preset threshold, perform joint coding on the at least one UCI; or if the type quantity of the at least one UCI is greater than a preset threshold, perform joint coding on a part of UCIs in the at least one UCI, and perform separate coding or joint coding on the other part of UCIs in the at least one UCI; or if the type quantity of the at least one UCI is greater than a preset threshold, drop N UCIs in the at least one UCI, and in a case that a type quantity of the rest UCIs is less than or equal to the preset threshold, perform separate coding on the rest UCIs, where the rest UCIs are the UCIs in the at least one UCI apart from the N UCIs, and N is a positive integer.

In a possible implementation, the coding module 62 is specifically configured to sequentially drop the N UCIs in the at least one UCI according to a preset sequence, where the preset sequence is a dropping sequence of the at least one UCI.

In a possible implementation, the at least one UCI includes at least one of the following types of information: first HARQ-ACK information, second HARQ-ACK information, first CSI, or second CSI. The first HARQ-ACK information and the second HARQ-ACK have different priorities, and the first CSI and the second CSI are different parts of a CSI report.

In a possible implementation, the priority of the first HARQ-ACK information is higher than the priority of the second HARQ-ACK information, the first CSI is a first part of the CSI report, and the second CSI is a second part of the CSI report.

In a possible implementation, the at least one UCI is sequentially dropped in the following sequence: the second CSI, the first CSI, the second HARQ-ACK information, and the first HARQ-ACK information.

In a possible implementation, the coding module 62 is specifically configured to: if the at least one UCI includes the first HARQ-ACK information and the second HARQ-ACK information, in a case that the type quantity of the at least one the UCI is less than or equal to the preset threshold, perform separate coding on the first HARQ-ACK information and the second HARQ-ACK information; or perform separate coding or joint coding on the first HARQ-ACK information and the second HARQ-ACK information based on configuration information of a network device; or perform separate coding or joint coding on the first HARQ-ACK information and the second HARQ-ACK information based on first information that respectively corresponds to the first HARQ-ACK information and the second HARQ-ACK information, where the first information includes at least one of the following: a bit quantity, a quantity of REs that need to be occupied for coding, or an offset.

In a possible implementation, the coding module 62 is specifically configured to: if the at least one UCI includes the first HARQ-ACK information, the second HARQ-ACK information, and the first CSI, perform separate coding on the first HARQ-ACK information, the second HARQ-ACK information, and the first CSI.

In a possible implementation, the coding module 62 is specifically configured to: if the at least one UCI includes the first HARQ-ACK information, the second HARQ-ACK information, the first CSI, and the second CSI, drop the second CSI, and perform separate coding on the first HARQ-ACK information, the second HARQ-ACK information, and the first CSI; or perform joint coding on the first HARQ-ACK information and the second HARQ-ACK information, and perform separate coding on the first CSI and the second CSI.

In a possible implementation, the coding manner of the first HARQ-ACK information, the second HARQ-ACK information, the first CSI, and the second CSI is: mapping a coded modulation symbol of the first HARQ-ACK information to an RE on the uplink data channel according to a first preset manner, and mapping a coded modulation symbol of the first CSI to an RE on the uplink data channel according to a second preset manner, where the second HARQ-ACK information is mapped to behind the first CSI, and the second HARQ-ACK information is mapped to behind the first CSI or the second CSI; or respectively mapping a coded modulation symbol of the first HARQ-ACK information and a coded modulation symbol of the second HARQ-ACK information to REs on the uplink data channel according to a first preset manner, where the second HARQ-ACK information is mapped to behind the first HARQ-ACK information; or mapping a coded modulation symbol of the first HARQ-ACK information to an RE on the uplink data channel according to a first preset manner, and mapping a coded modulation symbol of the second HARQ-ACK information to an RE on the uplink data channel according to a second preset manner.

In a possible implementation, the uplink data channel carries CG-UCI. The coding module 62 is specifically configured to: if the at least one UCI includes the first HARQ-ACK information and the second HARQ-ACK information, perform joint coding on the first HARQ-ACK information, the second HARQ-ACK information, and the CG-UCI; or in a case that a priority of the CG-UCI is the same as the priority of the first HARQ-ACK information, perform joint coding on the first HARQ-ACK information and the CG-UCI, and perform separate coding on the second HARQ-ACK information; or in a case that a priority of the CG-UCI is the same as the priority of the second HARQ-ACK information, perform joint coding on the second HARQ-ACK information and the CG-UCI, and perform separate coding on the first HARQ-ACK information.

In a possible implementation, the priority of the CG-UCI is the same as a priority of the uplink data channel, or the priority of the CG-UCI is configured by the network device.

In a possible implementation, the uplink data channel carries CG-UCI. The coding module 62 is specifically configured to: if the at least one UCI includes the first HARQ-ACK information, the second HARQ-ACK information, the first CSI, and the second CSI, drop the second CSI, perform joint coding on the first HARQ-ACK information and the second HARQ-ACK information, and perform separate coding on the first CSI and the CG-UCI; or drop the second CSI, and in a case that a priority of the CG-UCI is the same as the priority of the first HARQ-ACK information, perform joint coding on the first HARQ-ACK information and the CG-UCI, and perform separate coding on the second HARQ-ACK information and the first CSI; or drop the second CSI, and in a case that a priority of the CG-UCI is the same as the priority of the second HARQ-ACK information, perform joint coding on the second HARQ-ACK information and the CG-UCI, and perform separate coding on the first HARQ-ACK information and the first CSI; or drop the first CSI and the second CSI, and perform separate coding on the first HARQ-ACK information, the second HARQ-ACK information, and the CG-UCI.

In a possible implementation, the coding manner of the first HARQ-ACK information, the second HARQ-ACK information, the first CSI, and the CG-UCI is: mapping a coded modulation symbol of the CG-UCI to an RE on the uplink data channel according to a first preset manner, and respectively mapping a coded modulation symbol of the first HARQ-ACK information and a coded modulation symbol of the first CSI to REs on the uplink data channel according to a second preset manner, where the second HARQ-ACK information is mapped to behind the first CSI; or respectively mapping a coded modulation symbol of the first HARQ-ACK information, the coded modulation symbol of the second HARQ-ACK information, and the coded modulation symbol of the CG-UCI to REs on the uplink data channel according to a first preset manner, where the first HARQ-ACK information and the second HARQ-ACK information are mapped to behind the CG-UCI, and the second HARQ-ACK information is mapped to behind the first HARQ-ACK information; or mapping a coded modulation symbol of the first HARQ-ACK information to an RE on the uplink data channel according to a first preset manner, and mapping a coded modulation symbol of the CG-UCI to an RE on the uplink data channel according to a second preset manner, where the second HARQ-ACK information is mapped to behind the first CSI.

Th embodiment of this application provides an information multiplexing apparatus. For an uplink control channel and an uplink data channel that have different priorities, in a case that time domain resources for the uplink control channel and the uplink data channel overlap, the information multiplexing apparatus may multiplex at least one UCI carried on the uplink control channel onto the uplink data channel, so as to implement transmission of the at least one UCI carried on the uplink data channel. In addition, the information multiplexing apparatus may code the UCIs based on type information of the at least one UCI, that is, code the UCIs of different priorities to meet different transmission reliability requirements, thereby reducing impact on transmission performance of the uplink data channel. This can improve performance of uplink transmission.

The information multiplexing apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a laptop computer, a palmtop computer, a vehicle-mounted electronic device, a wearable device, a UMPC, a netbook, a PDA, or the like, and the non-mobile electronic device may be a server, a network attached storage (NAS), a personal computer (PC), a television (TV), a teller machine, a self-service machine, or the like. This is not specifically limited in the embodiments of this application.

The information multiplexing apparatus in this embodiment of this application may be an apparatus with an operating system. The operating system may be an Android operating system, may be an iOS operating system, or may be another possible operating system. This is not specifically limited in the embodiments of this application.

The information multiplexing apparatus provided in this embodiment of this application can implement each process implemented by the UE in the foregoing method embodiments. To avoid repetition, details are not described herein again.

Figure 7:
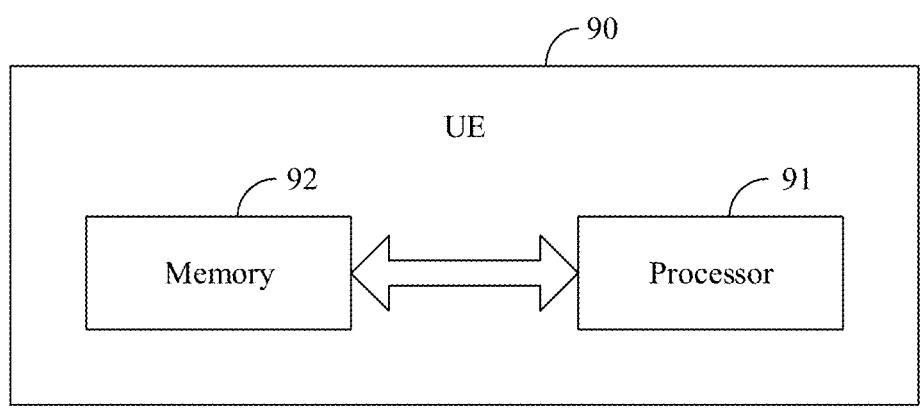
FIG. 7 is a first schematic diagram of a hardware structure of UE according to an embodiment of this application.

Optionally, as shown in FIG. 7, an embodiment of this application further provides a UE 90, including a processor 91, a memory 92, and a program or instructions stored in the memory 92 and capable of running on the processor 91. When the program or instructions are executed by the processor 91, the processes of the foregoing method embodiments are implemented, with the same technical effect achieved. To avoid repetition, details are not described herein again.

It should be noted that the UE in this embodiment of this application includes the above-mentioned mobile electronic device and non-mobile electronic device.

Figure 8:
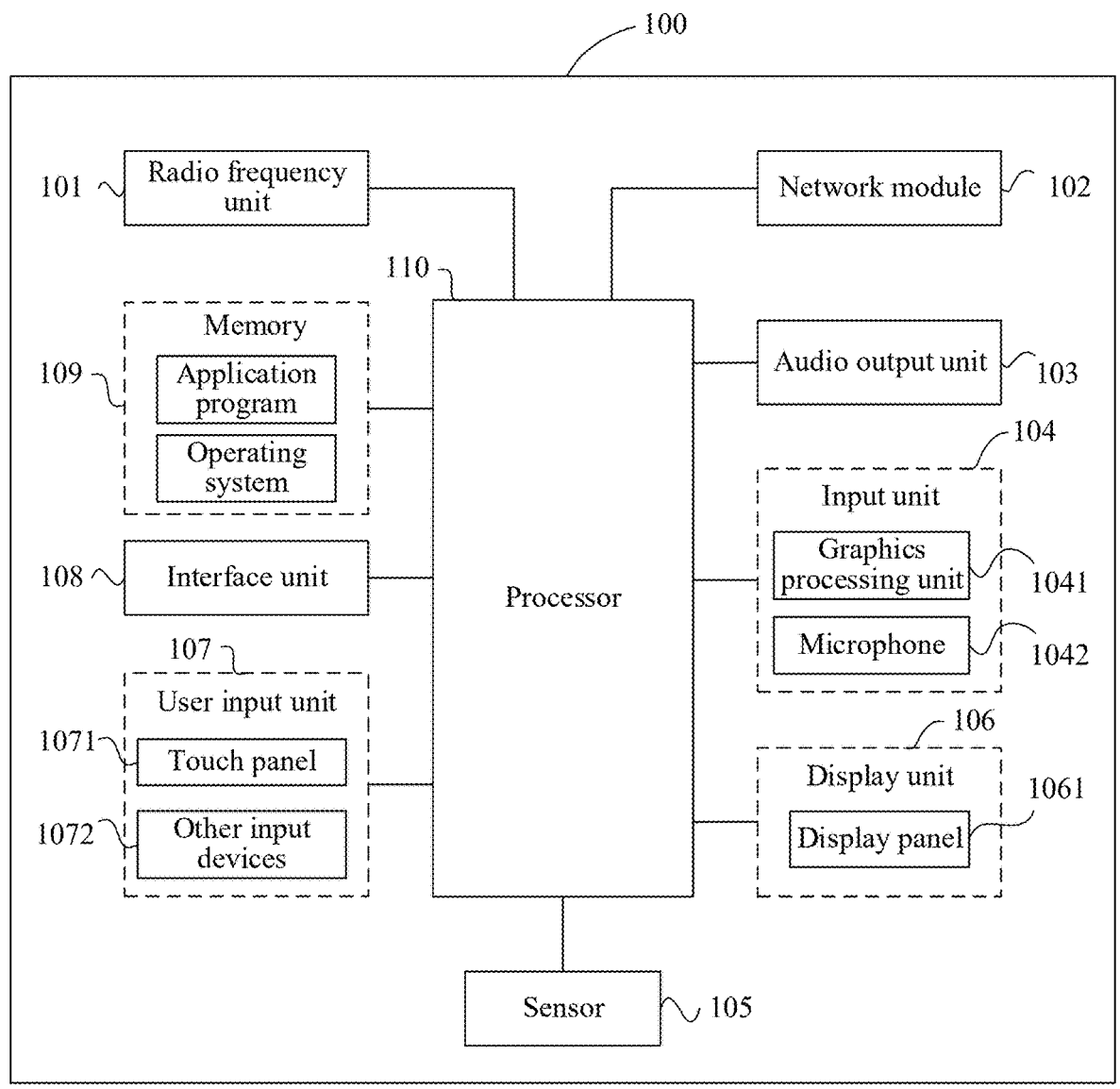
FIG. 8 is s second schematic diagram of a hardware structure of UE according to an embodiment of this application.

FIG. 8 is a schematic diagram of a hardware structure of a UE for implementing embodiments of this application.

The UE 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

A person skilled in the art may understand that the UE 100 may further include the power supply (for example, a battery) that supplies power to each component. The power supply may be logically connected to the processor 110 by using a power management system, so as to implement functions such as charging management, discharging management, and power consumption management by using the power management system. The structure of the UE shown in FIG. 8 does not constitute a limitation on the UE, and the UE may include more or fewer components than shown in the diagram, or some components may be combined, or the components may be disposed in different manners. Details are not described herein again.

The processor 110 is configured to: in a case that time domain resources for an uplink data channel and at least one uplink control channel overlap, multiplex the at least one UCI onto the uplink data channel, and code the at least one UCI based on type information of the at least one UCI, where the at least one UCI is a UCI carried on the at least one uplink control channel.

This embodiment of this application provides a UE. For an uplink control channel and an uplink data channel that have different priorities, in a case that time domain resources for the uplink control channel and the uplink data channel overlap, the UE may multiplex the at least one UCI carried on the uplink control channel onto the uplink data channel, so as to implement transmission of the at least one UCI carried on the uplink data channel. In addition, the UE may code the UCIs based on the type information of the at least one UCI, that is, code the UCIs of different priorities to meet different transmission reliability requirements, thereby reducing impact on transmission performance of the uplink data channel. This can improve performance of uplink transmission.

It should be understood that, in this embodiment of this application, the input unit 104 may include a graphics processing unit (GPU) 1041 and a microphone 1042. The graphics processing unit 1041 processes image data of a static picture or a video that is obtained by an image capture apparatus (for example, a camera) in a video capture mode or an image capture mode. The display unit 106 may include a display panel 1061, and the display panel 1061 may be configured in a form of a liquid crystal display, an organic light emitting diode, or the like. The user input unit 107 includes a touch panel 1071 and other input devices 1072. The touch panel 1071 is also referred to as a touchscreen. The touch panel 1071 may include two parts: a touch detection apparatus and a touch controller. The other input devices 1072 may include but are not limited to a physical keyboard, a function key (for example, a volume control key or a power on/off key), a trackball, a mouse, and a joystick. Details are not described herein. The memory 109 may be configured to store a software program and various data, including but not limited to an application program and an operating system. The processor 110 may integrate an application processor and a modem processor. The application processor mainly processes an operating system, a user interface, an application program, and the like. The modem processor mainly processes wireless communication. It should be understood that the modem processor may alternatively not be integrated into the processor 110.

An embodiment of this application further provides a readable storage medium, where the readable storage medium stores a program or instructions, and when the program or instructions are executed by a processor, the processes of the foregoing method embodiments are implemented, with the same technical effect achieved. To avoid repetition, details are not described herein again.

The processor is a processor in the UE in the foregoing embodiment. The readable storage medium includes a computer readable storage medium, such as a read-only memory (ROM), a random access memory (RAM), a magnetic disk, or an optical disc.

An embodiment of this application further provides a chip, where the chip includes a processor and a communications interface, the communications interface is coupled to the processor, and the processor is configured to run a program or instructions to implement processes in the foregoing method embodiments, with the same technical effect achieved. To avoid repetition, details are not described herein again.

It should be understood that the chip mentioned in this embodiment of this application may also be referred to as a system-level chip, a system chip, a chip system, or a system-on-chip.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus. In the absence of more restrictions, an element defined by "including a . . . " does not exclude another same element in a process, method, article, or apparatus that includes the element. In addition, it should be noted that the scope of the method and apparatus in the embodiments of this application is not limited to performing a function in a sequence shown or discussed, and may further include performing a function in a basically simultaneous manner or in a reverse sequence based on a function involved. For example, the described method may be performed in a different sequence, and various steps may be added, omitted, or combined. In addition, features described with reference to some examples may be combined in other examples.

By means of the foregoing description of the implementations, persons skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of this application essentially, or the part contributing to the prior art may be implemented in a form of a software product. The software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, a person of ordinary skill in the art may develop many other manners without departing from principles of this application and the protection scope of the claims, and all such manners fall within the protection scope of this application.

What is claimed is:

1. An information multiplexing method, comprising:
in a case that time domain resources for an uplink data channel and at least one uplink control channel overlap, multiplexing, by user equipment (UE), at least one uplink control information (UCI) onto the uplink data channel, and coding the at least one UCI based on type information of the at least one UCI, wherein the at least one UCI is UCI carried on the at least one uplink control channel, wherein the coding the at least one UCI based on type information of the at least one UCI comprises:
if the at least one UCI comprises first hybrid automatic repeat request-acknowledgment (HARQ-ACK) information, second HARQ-ACK information, and first channel state information (CSI), performing separate coding on the first HARQ-ACK information, the second HARQ-ACK information, and the first CSI;
or,
if the at least one UCI comprises first HARQ-ACK information, second HARQ-ACK information, first CSI, and second CSI, dropping the second CSI, and performing separate coding on the first HARQ-ACK information, the second HARQ-ACK information, and the first CSI;
or,
if the at least one UCI comprises first HARQ-ACK information and second HARQ-ACK information, and configured grant CG-UCI is carried on the uplink data channel, in a case that a priority of the CG-UCI is the same as the priority of the first HARQ-ACK information, performing joint coding on the first HARQ-ACK information and the CG-UCI, and performing separate coding on the second HARQ-ACK information; or in a case that a priority of the CG-UCI is the same as the priority of the second HARQ-ACK information, performing joint coding on the second HARQ-ACK information and the CG-UCI, and performing separate coding on the first HARQ-ACK information;
or,
if the at least one UCI comprises first HARQ-ACK information, second HARQ-ACK information, first CSI, and second CSI, and CG-UCI is carried on the uplink data channel,
dropping the second CSI, and in a case that a priority of the CG-UCI is the same as the priority of the first HARQ-ACK information, performing joint coding on the first HARQ-ACK information and the CG-UCI, and performing separate coding on the second HARQ-ACK information and the first CSI; or, dropping the second CSI, and in a case that a priority of the CG-UCI is the same as the priority of the second HARQ-ACK information, performing joint coding on the second HARQ-ACK information and the CG-UCI, and performing separate coding on the first HARQ-ACK information and the first CSI;
wherein priorities of the first HARQ-ACK information and the second HARQ-ACK information are different.

2. The method according to claim 1, wherein the at least one UCI comprises at least one of the following: first HARQ-ACK information, second HARQ-ACK information, first CSI, or second CSI, wherein
the first HARQ-ACK information and the second HARQ-ACK have different priorities, and the first CSI and the second CSI are different parts of a CSI report.

3. The method according to claim 2, wherein the priority of the first HARQ-ACK information is higher than the priority of the second HARQ-ACK, the first CSI is a first part of the CSI report, and a second CSI is the second part of the CSI report.

4. The method according to claim 3, wherein the coding the at least one UCI based on type information of the at least one UCI further comprises:
if the at least one UCI comprises the first HARQ-ACK information and the second HARQ-ACK information, performing separate coding on the first HARQ-ACK information and the second HARQ-ACK information based on first information that respectively corresponds to the first HARQ-ACK information and the second HARQ-ACK information, wherein the first information comprises at least one of the following: a bit quantity, a quantity of resource elements RE that need to be occupied for coding, or an offset, wherein the offset comprises a β offset and the β offset is configured by RRC or indicated by downlink control information (DCI).

5. The method according to claim 4, wherein a coding manner of the first HARQ-ACK information, the second HARQ-ACK information, the first CSI, and the second CSI is: mapping a coded modulation symbol of the first HARQ-ACK information to an RE on the uplink data channel according to a first preset manner, and mapping a coded modulation symbol of the second HARQ-ACK information to an RE on the uplink data channel according to a second preset manner.

6. The method according to claim 5, wherein the first preset manner is performing mapping starting from a first non-DMRS symbol that is after a first demodulation reference signal (DMRS); the second preset manner is performing mapping starting from a first non-DMRS symbol, wherein no symbol can be mapped to the RE to which the UCI is mapped according to the first preset manner.

7. The method according to claim 1, wherein the priority of the CG-UCI is the same as a priority of the uplink data channel.

8. User equipment UE, comprising a processor, a memory, and a program or instructions stored in the memory and capable of running on the processor, wherein when the program or the instructions are executed by the processor, the steps of an information multiplexing method are implemented, wherein the method comprises:
  in a case that time domain resources for an uplink data channel and at least one uplink control channel overlap, multiplexing, by user equipment (UE), at least one uplink control information (UCI) onto the uplink data channel, and coding the at least one UCI based on type information of the at least one UCI, wherein
  the at least one UCI is UCI carried on the at least one uplink control channel, wherein the coding the at least one UCI based on type information of the at least one UCI comprises:
  if the at least one UCI comprises first hybrid automatic repeat request-acknowledgment (HARQ-ACK) information, second HARQ-ACK information, and first channel state information (CSI), performing separate coding on the first HARQ-ACK information, the second HARQ-ACK information, and the first CSI;
  or,
  if the at least one UCI comprises first HARQ-ACK information, second HARQ-ACK information, first CSI, and second CSI, dropping the second CSI, and performing separate coding on the first HARQ-ACK information, the second HARQ-ACK information, and the first CSI;
  or,
  if the at least one UCI comprises first HARQ-ACK information and second HARQ-ACK information, and configured grant CG-UCI is carried on the uplink data channel, in a case that a priority of the CG-UCI is the same as the priority of the first HARQ-ACK information, performing joint coding on the first HARQ-ACK information and the CG-UCI, and performing separate coding on the second HARQ-ACK information; or in a case that a priority of the CG-UCI is the same as the priority of the second HARQ-ACK information, performing joint coding on the second HARQ-ACK information and the CG-UCI, and performing separate coding on the first HARQ-ACK information;
  or,
  if the at least one UCI comprises first HARQ-ACK information, second HARQ-ACK information, first CSI, and second CSI, and CG-UCI is carried on the uplink data channel,
  dropping the second CSI, and in a case that a priority of the CG-UCI is the same as the priority of the first HARQ-ACK information, performing joint coding on the first HARQ-ACK information and the CG-UCI, and performing separate coding on the second HARQ-ACK information and the first CSI; or, dropping the second CSI, and in a case that a priority of the CG-UCI is the same as the priority of the second HARQ-ACK information, performing joint coding on the second HARQ-ACK information and the CG-UCI, and performing separate coding on the first HARQ-ACK information and the first CSI;
  wherein priorities of the first HARQ-ACK information and the second HARQ-ACK information are different.

9. The UE according to claim 8, wherein the at least one UCI comprises at least one of the following: first HARQ-ACK information, second HARQ-ACK information, first CSI, or second CSI, wherein
  the first HARQ-ACK information and the second HARQ-ACK have different priorities, and the first CSI and the second CSI are different parts of a CSI report.

10. The UE according to claim 9, wherein the priority of the first HARQ-ACK information is higher than the priority of the second HARQ-ACK, the first CSI is a first part of the CSI report, and a second CSI is the second part of the CSI report.

11. The UE according to claim 10, wherein the coding the at least one UCI based on type information of the at least one UCI further comprises:
  if the at least one UCI comprises the first HARQ-ACK information and the second HARQ-ACK information, performing separate coding on the first HARQ-ACK information and the second HARQ-ACK information based on first information that respectively corresponds to the first HARQ-ACK information and the second HARQ-ACK information, wherein the first information comprises at least one of the following: a bit quantity, a quantity of resource elements RE that need to be occupied for coding, or an offset, wherein the offset comprises a β offset and the β offset is configured by RRC or indicated by downlink control information (DCI).

12. The UE according to claim 11, wherein a coding manner of the first HARQ-ACK information, the second HARQ-ACK information, the first CSI, and the second CSI is:
  mapping a coded modulation symbol of the first HARQ-ACK information to an RE on the uplink data channel according to a first preset manner, and mapping a coded modulation symbol of the second HARQ-ACK information to an RE on the uplink data channel according to a second preset manner.

13. The UE according to claim 12, wherein the first preset manner is performing mapping starting from a first non-DMRS symbol that is after a first demodulation reference signal (DMRS); the second preset manner is performing mapping starting from a first non-DMRS symbol, wherein no symbol can be mapped to the RE to which the UCI is mapped according to the first preset manner.

14. The UE according to claim 8, wherein the priority of the CG-UCI is the same as a priority of the uplink data channel.

15. A non-transitory computer readable storage medium, wherein the non-transitory computer readable storage medium stores a program or instructions, and when the program or the instructions are executed by a processor, the steps of an information multiplexing method, wherein the method comprises:
    in a case that time domain resources for an uplink data channel and at least one uplink control channel overlap, multiplexing, by user equipment (UE), at least one uplink control information (UCI) onto the uplink data channel, and coding the at least one UCI based on type information of the at least one UCI, wherein
    the at least one UCI is UCI carried on the at least one uplink control channel,
    wherein the coding the at least one UCI based on type information of the at least one UCI comprises:
    if the at least one UCI comprises first hybrid automatic repeat request-acknowledgment (HARQ-ACK) information, second HARQ-ACK information, and first channel state information (CSI), performing separate coding on the first HARQ-ACK information, the second HARQ-ACK information, and the first CSI;
    or,
    if the at least one UCI comprises first HARQ-ACK information, second HARQ-ACK information, first CSI, and second CSI, dropping the second CSI, and performing separate coding on the first HARQ-ACK information, the second HARQ-ACK information, and the first CSI;
    or,
    if the at least one UCI comprises first HARQ-ACK information and second HARQ-ACK information, and configured grant CG-UCI is carried on the uplink data channel, in a case that a priority of the CG-UCI is the same as the priority of the first HARQ-ACK information, performing joint coding on the first HARQ-ACK information and the CG-UCI, and performing separate coding on the second HARQ-ACK information; or in a case that a priority of the CG-UCI is the same as the priority of the second HARQ-ACK information, performing joint coding on the second HARQ-ACK information and the CG-UCI, and performing separate coding on the first HARQ-ACK information;
    or,
    if the at least one UCI comprises first HARQ-ACK information, second HARQ-ACK information, first CSI, and second CSI, and CG-UCI is carried on the uplink data channel, dropping the second CSI, and in a case that a priority of the CG-UCI is the same as the priority of the first HARQ-ACK information, performing joint coding on the first HARQ-ACK information and the CG-UCI, and performing separate coding on the second HARQ-ACK information and the first CSI; or, dropping the second CSI, and in a case that a priority of the CG-UCI is the same as the priority of the second HARQ-ACK information, performing joint coding on the second HARQ-ACK information and the CG-UCI, and performing separate coding on the first HARQ-ACK information and the first CSI;
    wherein priorities of the first HARQ-ACK information and the second HARQ-ACK information are different.

16. The non-transitory computer readable storage medium according to claim 15, wherein the at least one UCI comprises at least one of the following: first HARQ-ACK information, second HARQ-ACK information, first CSI, or second CSI, wherein
    the first HARQ-ACK information and the second HARQ-ACK have different priorities, and the first CSI and the second CSI are different parts of a CSI report.

17. The non-transitory computer readable storage medium according to claim 16, wherein the priority of the first HARQ-ACK information is higher than the priority of the second HARQ-ACK, the first CSI is a first part of the CSI report, and a second CSI is the second part of the CSI report.

18. The non-transitory computer readable storage medium according to claim 17, wherein the coding the at least one UCI based on type information of the at least one UCI further comprises:
    if the at least one UCI comprises the first HARQ-ACK information and the second HARQ-ACK information, performing separate coding or joint coding on the first HARQ-ACK information and the second HARQ-ACK information based on first information that respectively corresponds to the first HARQ-ACK information and the second HARQ-ACK information, wherein the first information comprises at least one of the following: a bit quantity, a quantity of resource elements RE that need to be occupied for coding, or an offset, wherein the offset comprises a β offset and the β offset is configured by RRC or indicated by downlink control information (DCI).

19. The non-transitory computer readable storage medium according to claim 18, wherein a coding manner of the first HARQ-ACK information, the second HARQ-ACK information, the first CSI, and the second CSI is:
    mapping a coded modulation symbol of the first HARQ-ACK information to an RE on the uplink data channel according to a first preset manner, and mapping a coded modulation symbol of the second HARQ-ACK information to an RE on the uplink data channel according to a second preset manner.

* * * * *